June 18, 1957 T. TINKER 2,796,341
METHOD OF OPERATION AND CONTROL SYSTEM FOR
CUPOLA AND ASSOCIATED APPARATUS
Filed Sept. 3, 1953 5 Sheets-Sheet 1

FIG. 1

INVENTOR.
TOWNSEND TINKER
BY
Andrew K. Fuller
HIS ATTORNEY

FIG. 2

INVENTOR.
TOWNSEND TINKER
BY
Andrew K. Foulds
HIS ATTORNEY

FIG. 3A

LEGEND:
- ⊣⊢ Open Interlock
- ⊣⊬ Closed Interlock
- ─○─ CR  Relay Coil
- ─○─ S   Signal Light
- ─○─ M  -Motor
- ⌒ Limit Switch
- ⚡ Solenoid
- ⊥ Push Button Switch

TOWNSEND TINKER
INVENTOR.

BY
*Andrew K. Foulds*
HIS ATTORNEY

FIG. 3B

INVENTOR.
TOWNSEND TINKER
BY
Andrew K. Fields
HIS ATTORNEY

FIG. 3C

TOWNSEND TINKER
INVENTOR.

United States Patent Office 2,796,341
Patented June 18, 1957

2,796,341

METHOD OF OPERATION AND CONTROL SYSTEM FOR CUPOLA AND ASSOCIATED APPARATUS

Townsend Tinker, Orchard Park, N. Y., assignor, by mesne assignments, to American Radiator & Standard Sanitary Corporation, New York, N. Y., a corporation of Delaware Application September 3, 1953, Serial No. 378,210

22 Claims. (Cl. 75—43)

This invention relates to new and useful improvements in metal treating and melting furnaces, such as iron melting cupolas and apparatus associated therewith, and more particularly to a method of operation of such furnaces and apparatus and a control system for effecting said method of operation.

Recently there has been developed certain new and improved apparatus for use in conjunction with iron melting cupolas or other furnaces for processing exhaust gases to reclaim waste heat therefrom, and to clean the gas prior to discharge to atmosphere. The development of this apparatus has required the development of new methods of operation of such cupola or furnace apparatus and new control systems for effecting the desired method of operation.

It is therefore one object of this invention to provide a new and improved method of operation for a system comprising a melting or treating furnace, such as a cupola, and processing equipment for reclaiming heat from and cleaning furnace exhaust gases.

Another object of this invention is to provide a new and improved method of operation for a cupola and associated gas conditioning apparatus in which the cupola and apparatus are operated through certain desirable steps of purging and combustion of fuel and ventilation in order to insure safe operation of the apparatus.

Another object of this invention is to provide a new and improved control system for an iron melting cupola and associated exhaust gas conditioning apparatus.

Another object is to provide a new and improved control system for an iron melting cupola and associated exhaust gas conditioning apparatus, which is operable to effect operation of the cupola and apparatus through the various steps of the method of operation which comprises a part of this invention.

Another object is to provide a new and improved control system for an iron melting cupola and associated exhaust gas conditioning apparatus which includes, in addition to the mechanism necessary for operation of the apparatus in the desired sequence, a number of safety controls which are effective to protect the apparatus upon occurrence of any of a number of unsafe operating conditions.

Other objects of this invention will become apparent from time to time throughout the specification and claims as hereinafter related.

This invention comprises the new and improved method of operation of the iron melting cupola and associated exhaust gas conditioning apparatus, and the new and improved control system for such cupola and apparatus, and the combination of parts making up such system which will be described more fully hereinafter, and the novelty of which will be particularly pointed out and distinctly claimed.

In the accompanying drawings to be taken as a part of this specification, there is clearly and fully illustrated a preferred embodiment of this invention in which drawings.

Figure 1:
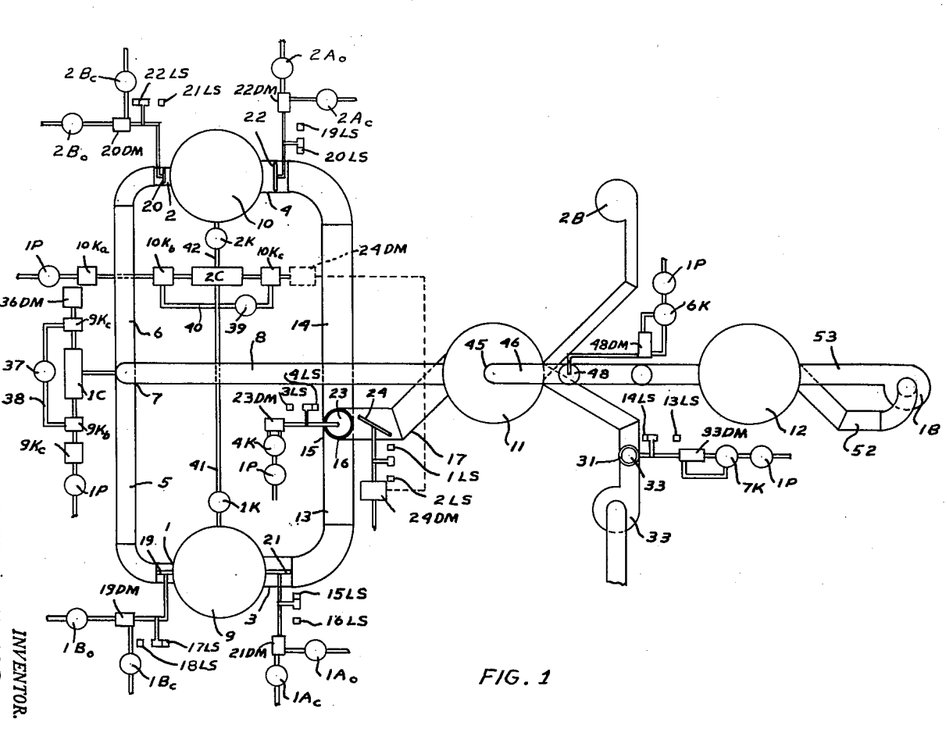
Fig. 1 is a diagrammatic plan view of a pair of iron melting cupolas and associated exhaust gas conditioning apparatus and control equipment.
Figure 2:
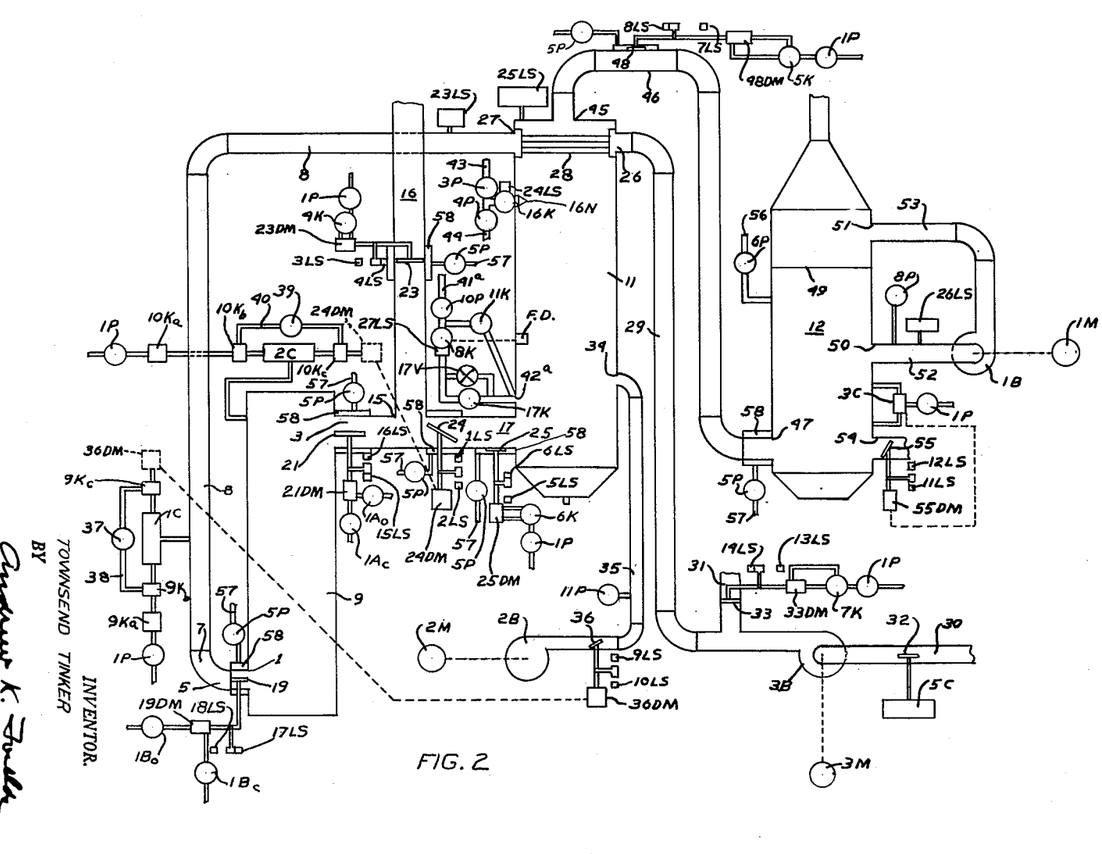
Fig. 2 is a diagrammatic view in elevation of the conditioning apparatus, the control equipment and one of the cupolas shown in Fig. 1.

Referring to the drawings by characters of reference, and more particularly to Figs. 1 and 2, there are shown a pair of iron melting cupolas 9 and 10 and associated gas conditioning apparatus comprising a combustion unit 11 and a dust collector unit 12.

The cupolas 9 and 10 have inlets 1 and 2 and outlets 3 and 4, respectively. The cupola inlets 1 and 2 receive branch inlet ducts 5 and 6 from a T connection 7 which is supplied by a single duct 8 extending from the combustion unit 11. The cupola outlets 3 and 4 discharge into branch ducts 13 and 14 which discharge into a side outlet T 15 having one outlet connected to a relief stack 16 and another outlet connected to a duct 17 leading to the combustion unit 11. The cupolas are provided with inlet selection dampers 19 and 20 and outlet selection dampers 21 and 22. The selection dampers are electrically interrelated in a manner which will be hereinafter set forth; so that when the inlet and outlet of one cupola are open, the inlet and outlet of the other cupola are closed. The inlet and outlet dampers for the cupolas 9 and 10 are provided with a suitable actuating means which are shown as damper motors 19DM, 21DM, 20DM, and 22DM. These damper motors are preferably arranged for hydraulic or pneumatic operation and are controlled by damper opening solenoids 1Bo, 2Bo, 1Ao, and 2Ao, respectively. These dampers are also provided with damper closing solenoids 1Ac, 2Ac, 1Bc, and 2Bc. The selection dampers for the cupolas 9 and 10 are each provided with associated mechanical limit switches for operating signal lights and other control circuits in the control system for this apparatus. The cupola inlet damper 19 is provided with limit switches 17LS and 18LS which are operated when the damper 19 is in closed or open position, respectively. The cupola outlet damper 21 is provided with limit switches 15LS and 16LS which are actuated when that damper is respectively opened or closed. In a similar manner, dampers 20 and 22 are provided with limit switches 22LS and 20LS operated by closing said dampers and limit switches 21LS and 19LS operated upon opening said dampers. The relief stack duct 16 and the duct 17 opening into the combustion unit 11 have dampers 23 and 24 respectively therein. The dampers 23 and 24 are electrically intereconnected in a manner which will be hereinafter described so that when one of the dampers is open the other is closed. The relief stack damper 23 is operated by a suitable damper motor 23DM and is controlled by an electric solenoid 4K. This damper is provided with a limit switch 4LS which is actuated upon closing movement of the damper and a limit switch 3LS which is actuated upon opening movement of the damper. The damper 24 is operated by a damper motor 24DM and has associated therewith limit switches 1LS and 2LS operated upon closing and opening movement of the damper, respectively. The connecting duct 17 is provided with a purge damper 25 which is operated by a damper motor 25DM and controlled by a solenoid 6K. The damper 25 has associated therewith limit switches 5LS and 6LS which are actuated upon opening and closing movement, respectively. The combustion unit 11 is arranged to receive exhaust gases from the cupola 9 or 10 and separates the heavier foreign particles in those gases and burns the gases to reclaim heat for the purpose of heating blast air for the cupola. Within the combustion chamber 11 adjacent its upper end, there is a heat exchanger 28 having an inlet 26 and an outlet 27. The outlet 27 is connected to the conduit 8 which leads to the T 7 and the branch ducts 5 and 6 to the cupolas 9 and 10. The inlet 26 is connected to a duct 29 which is connected to a blower 3B operated by a motor 3M. The blast air blower 3B is provided with an inlet duct 30 and a by-pass duct 31. The inlet duct 30 has a damper 32 therein which is controlled by a suitable pressure operated controller 5C to provide a constant weight of air to be delivered by the blower 3B according to the setting of the controller 5C. The by-pass duct 31 has a damper 33 therein which is operated by a damper motor 33DM and controlled by a solenoid 7K. The by-pass damper 33 has associated therewith limit switches 13LS and 14LS which are operated upon opening and closing movement thereof.

The combustion unit 11 is designed to burn part or all of the residual CO in the cupola exhaust gases for heating the blast air flowing through the heat exchanger 28. The air for combustion in the unit 11 is supplied through the inlet 34 to which is connected a duct 35 and combustion air blower 2B driven by a motor 2M. The combustion air duct 35 is provided with a damper 36 operated by a suitable damper motor 36DM. The damper 36 has limit switches 9LS and 10LS associated therewith which are operated upon opening and closing movement respectively of the damper 36. The damper motor 36DM for the damper 36 is controlled by a temperature controller 1C of the potentiometer type, which is responsive to the temperature of blast air in the blast air duct 8. The controller 1C controls the flow of control air or other operating fluid to the damper motor 36DM in response to temperature changes. The control air line through the controller 1C is controlled by solenoids 9Ka, 9Kb, and 9Kc. The solenoid 9Ka controls the flow of control air to the damper motor. The solenoids 9Kb and 9Kc are three-way type solenoids which control the flow of control air, either through the controller 1C or a manual controller 37 in a by-pass control air conduit 38. The cupolas 9 and 10 are provided with a pressure controller for controlling the damper 24 in a manner similar to the temperature controller 1C. There is provided a pressure controller 2C which controls the flow of control air to the damper motor 24DM to modulate the position of that damper to maintain a predetermined pressure in the top portion of the cupola. The control air line to the damper motor 24DM is provided with solenoids 10Ka, 10Kb, and 10Kc, which function similarly to the corresponding solenoids associated with the controller 1C. The solenoid 10Ka is a simple shut-off solenoid. The solenoids 10Kb and 10Kc control three-way valves which determine whether the flow of control air is through the automatic controller 2C or through a manual controller 39 in a by-pass conduit 40. The cupolas 9 and 10 are connected by conduits 41 and 42 to the controller 2C. The conduits 41 and 42 are provided with selection solenoids 1K and 2K. The combustion unit 11 is provided with a gas line 41a which supplies gas to a burner 42a for ignition of the gas and air mixture in the unit. The gas line 41a is controlled by a solenoid valve 8K which is controlled by a gas pressure responsive switch 10P and a flame responsive controller FD responsive to flame in the combustion unit. The gas line 41a is also provided with a main solenoid valve 17K for high flow of gas and a by-pass having a manually operated valve 17V for low flow of gas. The high-low valve arrangement is such that when the system is initially set into operation, there is a large flow of gas which produces a relatively large flame for heating the heat exchanger 28. When the cupola gases commence burning in the combustion unit, the solenoid valve 17K is closed and the ignition operation is continued through the by-pass valve 17V. The gas line 41a has a by-pass line which is controlled by a solenoid valve 11K for supplying gas to the burner 42a. The gas is ignited at the burner by a suitable electric ignition means which is not shown. When the ignition is turned on the solenoid valve 11K is opened and gas is ignited at the pilot burner. If there is proper ignition at the pilot burner the flame detector FD will be energized and will permit the valve 8K to be opened. The valve 8K is an electric safety shut off valve which is opened manually and held open electrically if the flame detectors indicate the presence of flame and closes when the flame goes out. The valve 8K has an associated limit switch 27LS which is closed when the valve is open. In the claims the burner 42a may be referred to as a pilot burner since it functions as a pilot to initiate combustion in the combustion unit 11.

The upper portion of the combustion unit 11 is provided with a water spray arrangement to cool to a predetermined limit value the combustion products passing over the heat exchanger 28. The combustion unit sprays are controlled by a solenoid valve 16K and are operated by a special spray nozzle 16N using a jet of compressed air flowing through a water chamber to break the water into a fine spray. This spray nozzle is shown in detail and claimed in my copending application Serial No. 280,759, filed April 5, 1952, now U. S. Patent No. 2,678,236, for Spray Nozzle. The spray air is supplied through a conduit 43 and the spray water through a conduit 44. There is also located at the upper end of the combustion unit 11 a thermal limit controller or limit switch 25LS which is connected in the control circuit which will be hereinafter described. The top portion of the combustion unit 11 has an outlet opening 45 connected by the conduit 46 to the inlet 47 of the dust collection unit 12. The conduit or duct 46 is provided with a purge damper 48 which is operated by a damper motor 48DM and controlled by a solenoid 6K. The damper 48 has associated therewith limit switches 7LS and 8LS actuated by opening and closing movement respectively of the damper. The dust unit 12 is divided internally by a partition 49 and has outlet and inlet openings 50 and 51 respectively below and above said partition. An induced draft type exhaust fan 1B driven by a motor 1M is connected between the dust unit openings 50 and 51 by ducts 52 and 53 respectively. The exhaust fan 1B is provided with a suction pressure switch 8P to indicate proper operation of the fan. There is also provided a thermal limit switch 26LS which is connected in the control circuit to protect the fan 1B from excessive temperature. The dust unit 12 has an auxiliary inlet 54 having a control damper 55 therein. The dust unit 12 is also provided with a stack differential pressure controller 3C which controls the flow of control air to the damper motor 55DM which controls the opening of the damper 55. The damper 55 also has associated therewith limit switches 11LS and 12LS which are actuated upon opening and closing movement respectively of the damper 55. The dust unit 12 is also provided with spray water for separating dust particles from the exhaust gases. The spray water is supplied through a conduit 56 and is controlled by a suitable manual spray valve which is not shown. The spray water conduit has associated therewith a flow responsive switch 6P which is responsive to flow of spray water into the dust unit 12. The various dampers which are operated pneumatically have pressure switches 1P associated therewith to indicate the presence of adequate control pressure at all points where control air is required. Since a substantial portion of this apparatus is handling gases at extremely high temperature, most of the dampers are water cooled. The water supply at each water cooled damper is from a conduit 57 into water cooled jacket 58. The flow of cooling water through the water cooled jacket is indicated by a flow switch 5P.

Figure 3A:
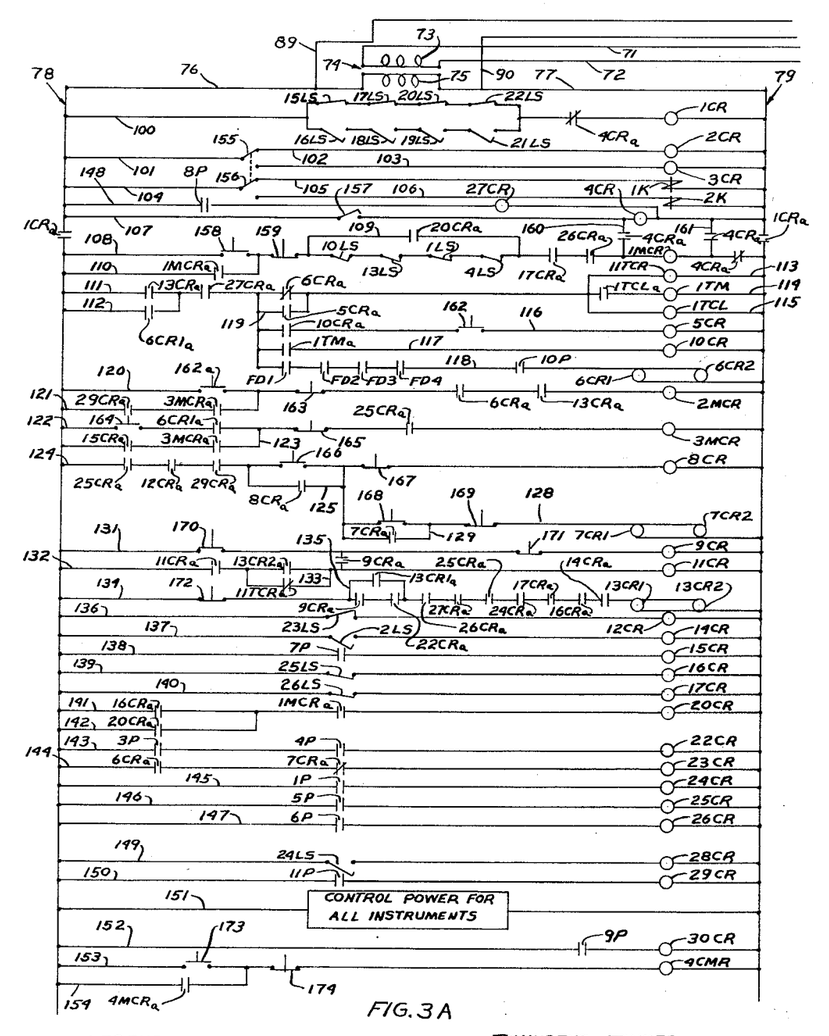
Fig. 3 is a "line diagram" showing the control wiring for the cupolas, apparatus and equipment shown in Figs. 1 and 2, and, due to its size, is shown on three separate sheets of drawings, the parts of which are numbered Fig. 3A, Fig. 3B, and Fig. 3C.
Figure 3B:
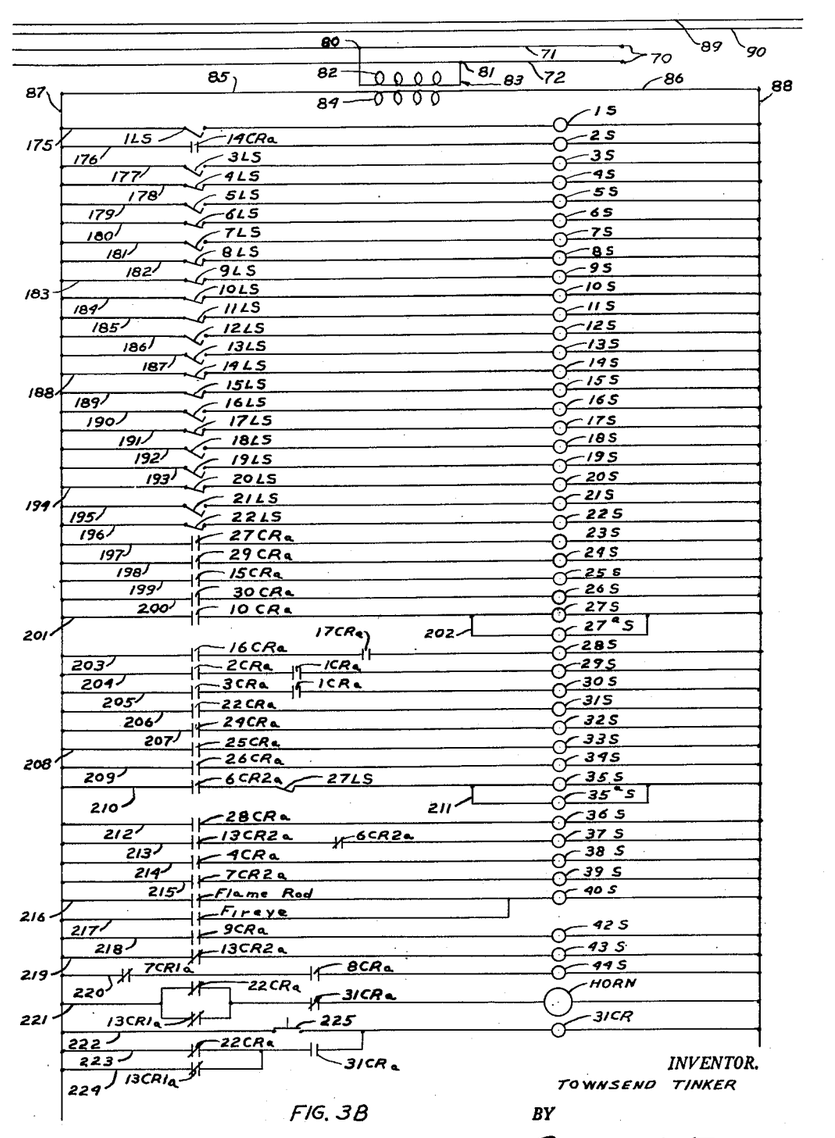
Figure 3C:
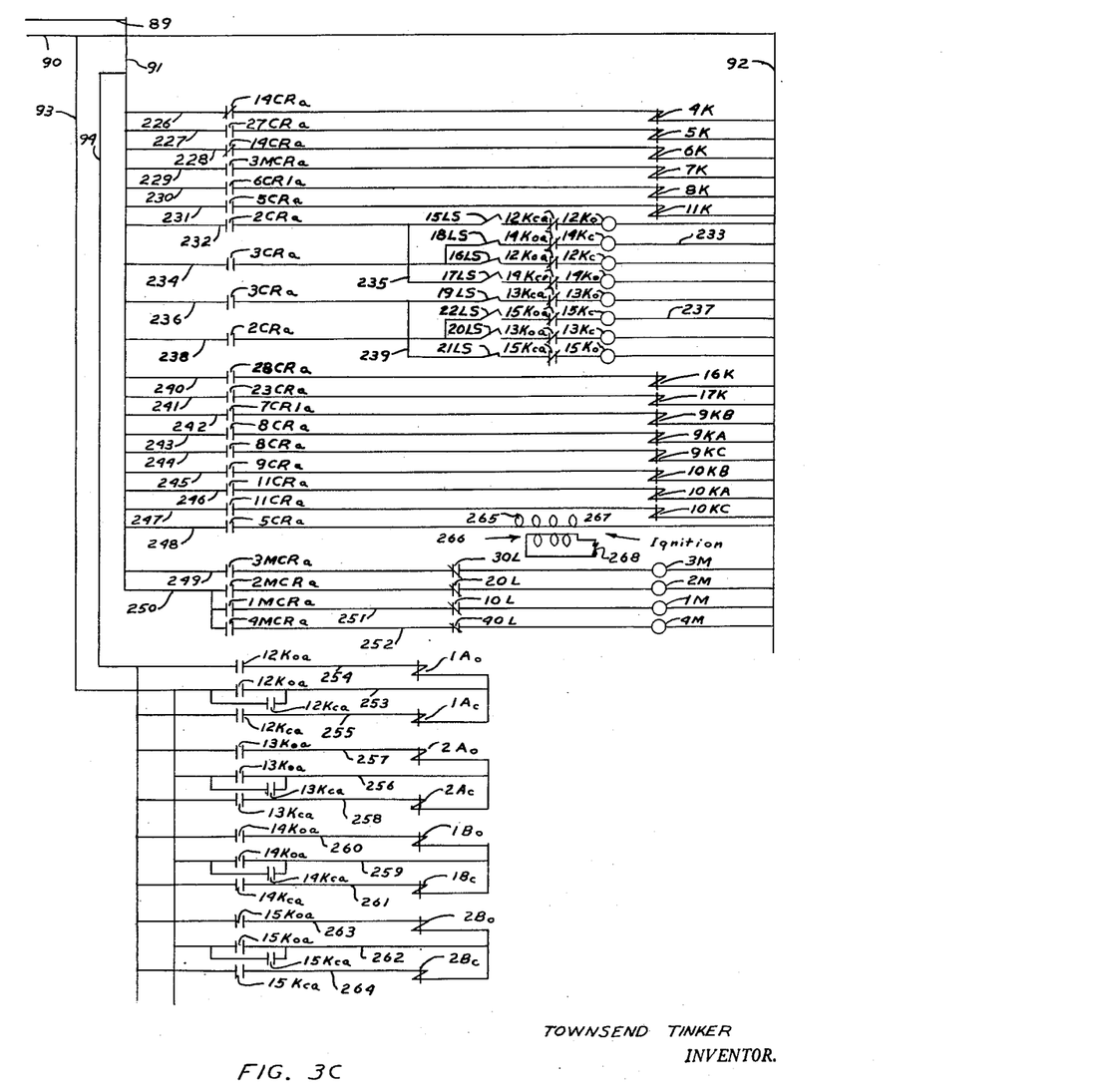

The electrical control wiring for the operation of the system just described is shown in the 3 sheets of drawings which comprise Figs. 3A, 3B, and 3C. These three sheets of drawings comprise a single wiring diagram of the "line diagram" type. A symbol legend is included on Fig. 3A to clarify the meaning of certain symbols used in these drawings.

In Fig. 3B of the drawings, there is shown a high voltage power source 70, preferably a source of 440 volt alternating current. The power source 70 is connected by wires 71 and 72 which extend into both Figs. 3A and 3B to the primary coil 73 of a control transformer 74. The secondary coil 75 of the transformer 74 is connected to wires 76 and 77 which are in turn connected to the base wires 78 and 79 of the line diagram shown in Figs. 3A. The secondary coil 75 preferably has an output of 110 v. The lead wires 71 and 72 are also connected at 80 and 81 to the primary coil 82 of a low voltage transformer 83. The transformer 83 has a low voltage (e. g. about six volts) secondary coil 84 connected by wires 85 and 86 to the base wires 87 and 88 of the line diagram shown in Fig. 3B. The 110 volt wires 76 and 77 in Fig. 3A are connected by wires 89 and 90 to the base wires 91 and 92 of the line diagram shown in Fig. 3C. The lead wires 90 and 91 are provided with connecting wires 93 and 94 providing a parallel circuit to the cupola selection solenoids.

In the line drawing shown in Fig. 3A, the horizontal wires indicating separate control circuits are numbered substantially consecutively as circuits 100 to 154 inclusive. The various relays recited in these control circuits sometimes have more than one pair of contacts. Where there are a plurality of relay contacts operating simultaneously by a single relay coil, these relay contacts are given a single reference numeral which comprises the number of its control relay plus the letter "a."

Circuit 100 includes a relay coil 1CR, normally closed relay contacts 4CRa, and two parallel legs including limit switches operated by the cupola selection dampers. The parallel legs of circuit 100, in the position shown, include closed limit switch 15LS, 17LS, 20LS, and 22LS and open limit switches 16LS, 18LS, 19LS, and 21LS. Circuit 101 includes a manually operated selector switch 155 for switching between circuits 102 and 103 which include relay coils 2CR and 3CR, respectively. Circuit 104 includes a manually operated selector switch 156 which switches between circuit 105 and 106 including solenoids 1K and 2K, respectively. The switches 155 and 156 are preferably connected for conjoint operation. Circuit 107 includes a manually operated switch 157 and a relay coil 4CR. The relay coil 1CR in circuit 100 controls relay contacts 1CRa in the base circuit legs 78 and 79, respectively, and located at a point between circuits 107 and 108. The circuit 108 includes a normally open starting switch 158 and a normally closed stopping switch 159. This circuit also includes limit switches 10LS, 13LS, 1LS, and 4LS and relay contacts 17CRa, 26CRa, 4CRa and relay coil 1MCR. Circuit 110 is connected to circuit 108 in parallel therewith, and by-passing the normally open starting switch 158. The circuit 110 includes holding relay contacts 1MCRa. Circuit 109 is a holding circuit including relay contacts 20CRa and is connected in parallel with circuit 108 by-passing the limit switches 10LS, 13LS, 1LS, and 4LS. The circuits 107 and 108 are connected by wires 160 and 161 including relay contacts 4CRa to provide a holding circuit for the motor control relay 1MCR when circuit 107 is energized. Circuit 111 includes relay contacts 13CRa controlled by circuit 134, relay contacts 27CRa controlled by circuit 148, and relay contacts 6CRa controlled by circuit 118. Circuit 112 includes normally open relay contacts 6CR1a and is connected in parallel with circuit 111 by-passing relay contacts 13CRa. Circuit 119 is a circuit including relay contacts 5CRa which provides a parallel connection with circuit 111 by-passing the relay contacts 6CRa. Circuit 114 includes relay contacts 1TCLa and timer motor coil 1TM as a continuation of circuit 111. Circuits 113 and 115 are parallel circuits connected from circuit 111 and include relay coil 11TCR and relay clutch coil 1TCL respectively. Circuit 116 is connected in parallel with circuit 111 and includes a starting switch 162, a relay coil 5CR, and relay contacts 10CRa controlled by circuit 117. Circuit 117 includes relay coil 10CR and time controlled relay contacts 1TMa, controlled by motor 1TM, and is connected in parallel with circuits 116 and 111. Circuit 118 includes relay coils 6CR1, and 6CR2, switch 10P (responsive to gas pressure) and flame detector switches FD1, FD2, FD3 and FD4, the circuit being connected in parallel with circuits 111, 116, and 117. Circuit 120 includes starting and stopping switches 162a and 163, relay contacts 6CRa controlled by circuit 118, relay contacts 13CRa controlled by circuit 134, and motor control relay 2MCR. Circuit 121 is a holding circuit including relay contacts 29CRa controlled by circuit 150, relay contacts 3MCRa controlled by circuit 122 and is connected in parallel with circuit 120 by-passing the starting switch 162a. Circuit 122 includes a starting switch 164, relay contacts 6CR1a, a stopping switch 165, relay contacts 25CRa (controlled by circuit 146) and relay coil 3MCR for controlling the motor 3M. Circuit 123 is a holding circuit in parallel with circuit 122, by-passing switch 164, and contacts 6CR1a, and including relay contacts 3MCRa and 15CRa (controlled by circuit 138). Circuits 124 to 130 inclusive are arranged to control the blast air temperature. Circuit 124 includes relay contacts 25CRa controlled by circuit 146, relay contacts 12CRa controlled by circuit 136, relay contacts 29CRa controlled by circuit 150, starting and stopping switches 166 and 167, and relay coil 8CR. Circuit 125 is a holding circuit including relay contacts 8CRa by-passing the starting switch 166. Circuit 128 includes starting and stopping switches 168 and 169 and relay coils 7CR1 and 7CR2 connected in parallel with circuit 124 at a point between the starting and stopping switches 166 and 167. Circuit 129 is a holding circuit for circuit 128 and includes relay contacts 7CR connected in parallel with the starting switch 168. Circuit 131 is a control circuit for the cupola top pressure controller, and includes starting and stopping switches 170 and 171 and relay coil 9CR. Circuit 132 includes relay contacts 11CRa, 13CR2a, and relay coil 11CR. Circuits 131 and 132 are connected in parallel by relay contacts 9CRa at a point between the switches 170 and 171. Circuit 133 is a time controlled circuit connected in parallel with contacts 13CR2a in circuit 132 and including time controlled relay contacts 11TCRa. Circuit 134 is a control circuit for the safety relays 13CR1 and 13CR2 which dominate several of the control circuits as a safety control. Circuit 134 includes manually operated switch 172, relay contacts 9CRa controlled by circuit 131, 22CRa controlled by circuit 143, 26CRa controlled by circuit 147, 27CRa controlled by circuit 148, 25CRa controlled by circuit 146, 24CRa controlled by circuit 145, 17CRa controlled by circuit 140, 16CRa controlled by circuit 139, 14CRa controlled by circuit 137, and relay coils 13CR1 and 13CR2. Circuit 135 is a holding circuit including relay contacts 13CR1a connected in parallel with contacts 22CRa and 26CRa in circuit 134. Circuit 136 includes limit switch 23LS controlled by blast air temperature, and relay coil 12CR. Circuit 137 includes limit switch 2LS controlled by closing movement of the pressure control damper 24 and the relay coil 14CR. Circuit 138 includes pressure switch 7P responsive to air pressure from the blast air fan 3B and the relay coil 15CR. Circuit 139 includes the relay coil 16CR and limit switch 25LS which is responsive to temperature in the combustion unit adjacent the heat exchanger. Circuit 140 includes the relay coil 17CR and the limit switch 26LS which is responsive to temperature in the dust collector unit. Circuit 141 includes the relay coil 20CR and relay contacts 1MCRa controlled by circuit 108, and relay contacts 16CRa controlled by circuit 139. Circuit 142 is a holding circuit for circuit 141 and includes relay switch contacts 20CRa connected in parallel with contacts 16CRa. Circuit 143 includes relay coil 22CR and switch 4P, responsive to spray water pressure at the combustion unit, and switch 3P, responsive to spray air pressure at the combustion unit. Circuit 144 includes relay coil 23CR and relay contacts 7CRa controlled by circuit 128, and relay contacts 6CRa controlled by circuit 118. Circuit 145 includes relay coil 24CR and switch 1P which is responsive to control air pressure for the various control instruments. Circuit 146 includes relay coil 25CR and switch 5P which is responsive to the flow of cooling water to the various water cooled dampers. Circuit 147 includes relay coil 26CR and switch 6P which is responsive to the flow of water in the dust collector unit. Circuit 148 is located between circuits 104 and 107 and includes relay coil 27CR and switch 8P which is responsive to suction pressure indicating normal operation of the exhaust fan 1B. Circuit 149 includes relay coil 28CR and limit switch 24LS which is operated by the turning on of the combustion unit temperature limiting sprays. Circuit 150 includes relay coil 29CR and switch 11P which is responsive to air pressure from the combustion air blower 2B. Circuit 151 is a continually energized circuit which supplies control power for all electrical instruments. Circuit 152 includes relay coil 30CR and switch 9P responsive to air pressure from the soot blower operated by motor 4M. Circuit 153 includes starting and stopping switches 173 and 174 and a relay coil 4MCR for controlling the soot blower air compressor 4M which is used to clean out the heat exchanger tubes. Circuit 154 is a holding circuit for circuit 153 and includes relay contacts 4MCRa connected in parallel with the starting switch 173.

In Fig. 3B there are shown a plurality low voltage signal circuits which are numbered 175 to 224 inclusive.

In circuit 175 there is a limit switch 1LS operated by the pressure control damper 24 and a signal light 1S which indicates that the damper 24 is open. Circuit 176 includes a signal light 2S for indicating that the damper 24 is closed and is controlled by relay contacts 14CRa. Circuit 177 includes limit switch 3LS and signal light 3S which indicates that the relief stack damper 23 is open. Circuit 178 includes limit switch 4LS and signal light 4S which indicates that the relief stack damper 23 is closed. Circuit 179 includes limit switch 5LS and signal light 5S which indicates that the purge damper 25 is open. Circuit 180 includes limit switch 6LS and signal light 6S which indicates that the purge damper 25 is closed. Circuit 181 includes limit switch 7LS and signal light 7S which indicates that purge damper 48 is open. Circuit 182 includes limit switch 8LS and signal light 8S which indicates that purge damper 48 is closed. Circuit 183 includes limit switch 9LS and signal light 9S which indicates that the combustion air damper 36 is open. Circuit 184 includes limit switch 10LS and signal light 10S which indicates that the combustion air damper 36 is closed. Circuit 185 includes limit switch 11LS and signal light 11S for indicating that the dust unit air damper 55 is open. Circuit 186 includes limit switch 12LS and signal light 12S for indicating that the dust unit air damper 55 is closed. Circuit 187 includes limit switch 13LS and signal light 13S for indicating that the blast air blower by-pass damper 33 is open. Circuit 188 includes limit switch 14LS and signal light 14S for indicating that the blast air blower by-pass damper 33 is closed. Circuit 189 includes limit switch 15LS and signal light 15S for indicating that the outlet damper 21 from the cupola 9 is open. Circuit 190 includes limit switches 16LS and signal light 16S for indicating that the outlet damper 21 from the cupola 9 is closed. The circuit 191 includes limit switch 17LS and signal light 17S for indicating that the inlet damper 19 to the cupola 9 is open. Circuit 192 includes limit switch 18LS and signal light 18S to indicate that the inlet damper 19 to cupola 9 is closed. Circuit 193 includes limit switch 19LS and signal light 19S for indicating that the outlet damper 22 from cupola 10 is open. Circuit 194 includes limit switch 20LS and signal light 20S for indicating that the outlet damper 22 from cupola 10 is closed. Circuit 195 includes limit switch 21LS and signal 21S for indicating that the inlet damper 20 to cupola 10 is open. Circuit 196 includes limit switch 22LS and signal light 22S for indicating that the inlet damper 20 to cupola 10 is closed. Circuit 197 includes relay contacts 27CRa and signal light 23S for indicating that the exhaust fan 1B is operating. Circuit 198 includes relay contacts 29CRa and signal light 24S for indicating that the combustion air blower 2B is running. Circuit 199 includes relay contacts 15CRa and signal light 25S for indicating that the blast air blower 3B is running. Circuit 200 includes relay contacts 30CRa and signal light 26S for indicating that the soot blower 4B is running. Circuits 201 and 202 include relay contacts 19CRa and signal lights 27S and 27aS for indicating that the combustion unit burner 42 is ready for combustion. Signal light 27S would be located on the control panel and light 27aS adjacent to the gas valve at the combustion unit. Circuit 203 includes relay switch contacts 16CRa, 17CRa, and signal light 28S for indicating that the heat exchanger and dust unit gas temperatures are normal. Circuit 204 includes relay contacts 2CRa and 1CRa and signal light 29S for indicating that cupola 9 has been selected by the selector switches 155 and 156. Circuit 205 includes relay contacts 3CRa and 1CRa and signal light 30S for indicating that cupola 10 has been selected by the selector switches 155 and 156. Circuit 206 includes relay contacts 22CRa and signal light 31S for indicating that the combustion unit tempering sprays are ready for operation. Circuit 207 includes relay contacts 24CRa and signal light 32S for indicating that control air for the equipment is on at all points. Circuit 208 includes relay contacts 25CRa and signal light 33S for indicating that the cooling water is flowing to the water cooled dampers. Circuit 209 includes relay contacts 26CRa and signal light 34S for indicating that water is flowing in the dust collector unit 12. Circuits 210 and 211 include relay contacts 6CR2a, limit switch 27LS, and signal lights 35S and 35aS (located on the control panel and at the burner) for indicating that the combustion unit burners are on. Circuit 212 includes relay contacts 28CRa and signal light 36S for indicating that the combustion unit sprays are operating. Circuit 213 includes relay contacts 13CR2a and 6CR2a and signal light 37S for indicating that a purging operation is in progress. Circuit 214 includes relay contacts 4CRa and signal light 38S for indicating that the ventilating fan circuit is energized. Circuit 215 includes relay contacts 7CR2a and signal light 39S for indicating that the blast air temperature controller is set for automatic operation. Circuits 216 and 217 include a flame responsive flame rod and fireye and signal light 40S for indicating that cupola gas is burning in the combustion unit. Circuit 218 includes relay contacts 9CRa and signal light 42S for indicating that the cupola top pressure controller is set for automatic operation. Circuit 219 includes relay contacts 13CR2a and signal light 43S for indicating an emergency "dumping" operation. Circuit 220 includes relay contacts 7CR1a and 8CRa and signal light 44S for indicating that the blast air temperature controller is set for manual operation. Circuit 221 includes parallel relay contacts 22CRa and 13CR1a and relay contacts 31CRa and a signal horn for audible indication of an emergency "dumping" operation. Circuits 222, 223, and 224 are parallel circuits for silencing the horn circuit 221 after an emergency "dumping" operation. Circuit 222 includes a normally open silencing switch 225 and a relay coil 31CR. Circuit 223 includes relay contacts 22CRa and 31CRa connected in parallel with and by-passing the silencing switch 225. Circuit 224 includes relay contacts 13CR1a and is connected in parallel with contacts 22CRa in circuit 223.

In Fig. 3C, there is shown a line diagram of 110 volt circuit for controlling the various solenoids and motors. In this figure there are shown a series of control circuits numbered 226 to 252, inclusive, and selection solenoid control circuits 253 to 264, inclusive. Circuits 226 and 228 include relay contacts 14CR$_a$ and solenoid coils 4K and 6K, respectively, for operating the relief stack damper 23 and the purge damper 25, respectively. Circuit 227 includes relay contacts 27CR$_a$ and solenoid 5K for controlling purge damper 48. Circuit 229 includes relay contacts 3MCR$_a$ and solenoid 7K for controlling the blast air blower by-pass damper 33. Circuit 230 includes relay contacts 6CR1$_a$ and solenoid 8K for controlling the main safety shut-off gas valve. Circuit 231 includes relay contacts 5CR$_a$ and solenoid 11K for controlling the gas pilot valve. Circuit 232 includes relay contacts 2CR$_a$, limit switch 15LS, relay contacts 12K$_{ca}$, and relay coil 12K$_o$. Circuit 234 includes relay contacts 3CR$_a$ and 12K$_{oa}$, limit switch 16LS, and relay coil 12K$_c$. Circuit 233 is connected in parallel with circuit 234 and includes relay contacts 14K$_{oa}$, and relay coil 14K$_c$. Circuit 235 is connected in parallel with circuit 232 and includes relay contacts 14K$_{ca}$, limit switch 17LS, and relay coil 14K$_o$. Circuit 236 includes relay contacts 3CR$_a$, 13K$_{ca}$, limit switch 19LS, and relay coil 13K$_o$. Circuit 239 is connected in parallel with circuit 236 and includes relay contacts 15K$_{ca}$, limit switch 21LS, and relay coil 15K$_o$. Circuit 238 includes relay contacts 2CR$_a$, 13K$_{oa}$, limit switch 20LS, and relay coil 13K$_c$. Circuit 237 is connected in parallel with circuit 238 and includes relay contact 15K$_{oa}$, limit switch 22LS, and relay coil 15K$_c$. Circuit 240 includes relay contacts 28CR$_a$ and solenoid 16K for controlling the combustion unit sprays. Circuit 241 includes relay contacts 23CR$_a$ and solenoid 17K for controlling the high flame gas burner valve. Circuit 242 includes relay contact 7CR1$_a$ and solenoid 9KB for controlling the blast air temperature controller. Circuits 243 and 244 include relay contacts 8CR$_a$ and solenoids 9KA and 9KC connected in parallel for controlling automatic operation of the blast temperature controller. Circuit 245 includes relay contacts 9CR$_a$ and solenoid 10KB for controlling the cupola top pressure controller. Circuits 246 and 247 include relay contacts 11CR$_a$ and solenoids 10KA and 10KC, respectively, connected in parallel for controlling automatic operation of the cupola top pressure controller. Circuit 248 includes relay contacts 5CR$_a$ and the primary coil 265 of an ignition transformer 266 having a secondary winding 267 and an electric spark ignition 268 for igniting gas at the pilot burners in the combustion unit. Circuits 249, 250, 251, and 252 include motor control relay contacts 3MCR$_a$, 2MCR$_a$, 1MCR$_a$, and 4MCR$_a$, respectively, connected in series with motors 3M, 2M, 1M, and 4M. The aforementioned motor circuits each include circuit breaking overload limit switches 30L, 20L, 10L, and 40L, respectively. Circuit 253 includes parallel relay switches 12K$_{oa}$ and 12K$_{ca}$ and has parallel legs 254 and 255. The parallel legs 254 and 255 include, respectively, the solenoid 1A$_o$ and relay contacts 12K$_{oa}$ and solenoid 1A$_c$ and relay contacts 12K$_{ca}$. Circuit 256 includes parallel relay contacts 13K$_{oa}$ and 13K$_{ca}$ and has parallel legs 257 and 258, respectively, including solenoid coil 2A$_o$ and relay contacts 13K$_{oa}$ and solenoid coil 2A$_c$ and relay coil 13K$_{ca}$. Circuit 259 includes parallel relay contacts 14K$_{oa}$ and 14K$_{ca}$ and parallel legs 260 and 261, respectively, including solenoid 1B$_o$ and relay contacts 14K$_{oa}$ and solenoid 1B$_c$ and relay contacts 14K$_{ca}$. Circuit 262 includes parallel relay contacts 15K$_{oa}$ and 15K$_{ca}$ and parallel legs 263 and 264, respectively, including solenoid coil 2B$_o$ and relay contacts 15K$_{oa}$ and solenoid coil 2B$_c$ and relay contacts 15K$_{ca}$.

It should be understood that the various relays, control switches, and signal lights are located on or adjacent to a single control panel where the operation of the system may be observed by an operator and the various steps of the method of operation performed by actuation of the particular switches or controls for effecting such operation. The limit switches, controllers, solenoids, and damper motors are located at their particular operating locations indicated in Figs. 1 and 2 and are wired in the control circuit in the manner just described for Figs. 3A, 3B, and 3C.

*Operation*

In operation this apparatus is arranged to perform a new and improved method of operation for a cupola and associated exhaust gas conditioning apparatus. The cupolas 9 and 10 are arranged to be operated alternatively and have a single blast air supply and a single exhaust duct and relief stack. The particular cupola which is in operation is ignited and supplied with blast air for burning the coal or coke therein. The exhaust gases from the cupola are led to the combustion unit 11 where part of the foreign matter carried in the gases is removed and some or all of the residual CO in the gases is burned to provide heat for heating the blast air supplied to the cupola. The combustion unit is provided with suitable burning equipment for burning the cupola exhaust gases and is provided with temperature limiting sprays for limiting the temperature of combustion products adjacent the heat exchanger in the upper end of the combustion unit. The method of combustion and tempering sprays are described more fully in my copending applications, Serial Nos. 287,888 and 287,889, filed May 15, 1952. The gases are led from the combustion unit to the collector unit 12 where they are further cooled and cleaned by very fine sprays of water before the gases are discharged to atmosphere.

In operation one of the cupolas is first selected for operation. The cupola and associated equipment is purged after closing the purge dampers 25 and 48 and stack damper 23, the dampers 36 and 55 being closed and damper 24 being open. The other dampers are in the position shown in Figs. 1 and 2. The exhaust fan 1B is operated to draw air through the system for a predetermined time. When purging has been completed, the burners in the combustion unit 11 are ignited. The cupola is then lit and operated with a relatively small quantity of air circulated by the exhaust fan. When the cupola has been operating long enough to furnish exhaust gases rich enough in CO to burn, the blast air blower 3B and combustion air blower 2B are started. The combustion of gases in the unit 11 is operable to heat the air supplied by the blast air blower 3B to the cupola. The temperature of blast air and combustion products is automatically controlled by the temperature limiting sprays and the automatic blast air temperature controller. The gases from the unit 11 are conducted to the collector unit 12 for further cleaning of the gases before discharge to atmosphere. The system is provided with a number of safety devices for protecting the combustion unit 11 and the collector unit 12. Upon occurrence of any one of a number of unsafe operating conditions, the pressure control damper 24 is closed and the relief stack damper 23 is opened to dump the cupola exhaust gases directly to atmosphere. At the end of a cupola operating cycle, the system is ventilated by the exhaust fan 1B after the blast air blower 3B and combustion air blower 2B are turned off. When it is desired to have a forced ventilation of the units 11 and 12 only, the exhaust fan is set for ventilating operation which causes the purge damper 25 and relief stack damper 23 to open and the pressure control damper 24 to close, so that the continued operation of the exhaust fan will ventilate these units. After the system is given its final ventilation and is cooled down sufficiently, the various control elements which are mechanically operated can be turned off.

The control system which was described in Figs. 3A, 3B, and 3C is operable to effect the operation of the cupola and associated equipment in the manner described. Assume that the system has just been energized and that cupola 10 was last in operation. Also assume that all cooling water, control air, and water and air for cooling and cleaning sprays have been turned on. In this condition, the control panel including the signal lights will appear as follows: the spray air and spray water for the combustion unit are turned on, thus closing switches 3P and 4P in circuit 143 and energizing relay coil 22CR, and causing its contacts 22CRa in circuit 206 to be actuated and signal light 31S turned on, to give an indication that the combustion unit sprays are ready. Cooling water is flowing at all points where required, thus closing switch 5P in circuit 146 and energizing relay coil 25CR and closing its contacts 25CRa in circuit 208 to turn on signal light 33S to indicate that the cooling water is flowing. The water for the dust collector unit 12 is flowing and causes switch 6P in circuit 147 to close and energize relay 26CR and close its contacts 26CRa to light the signal 34S indicating that the dust unit water is on. The temperatures in the units 11 and 12 are normal, and so the limit switches 25LS and 26LS are closed, and their respective relays 16CR and 17CR are energized to provide a signal that the temperatures are normal by lighting signal light 28S. The combustion air damper 36 is closed, thus causing limit switch 10LS to be closed to light signal light 10S. The blast air blower bypass damper 33 is open, thus causing limit switch 13LS to be closed and signal light 13S to be lit. The collector unit damper 55 is open, and its associated limit switch 11LS is closed, lighting signal light 11S. The "dump" signal light 43S and signal horn in circuits 219 and 221, respectively, are both energized. The horn circuit can be de-energized by operating the silencing switch 22S providing relay 22CR in circuit 143 is energized. The pressure control damper 24 is closed, and limit switch 2LS in circuit 137 is closed, and relay coil 14CR is energized. The energization of relay coil 14CR causes contacts 14CRa in circuit 176 to be closed, to light the signal 2S; and relay contacts 14CRa in circuits 226 and 228 to be opened to de-energize the solenoids 4K and 6K to cause the relief stack damper 23 to be opened and the purge damper 25 to be opened. Purge damper 48 is controlled by relay contacts 27CRa in circuit 227 controlled by exhaust fan operation. The opening of the last named dampers causes limit switches 3LS, 5LS, and 7LS to be closed, thus lighting the signal lights 3S, 5S, and 7S, respectively. The inlet and outlet dampers 20 and 22 from the cupola 10 are open and the inlet and outlet dampers 19 and 21 from the cupola 9 are closed, thus closing limit switches 16LS, 18LS, 19LS, and 21LS to cause signal lights 16S, 18S, 19S, and 21S to be lighted. Since the cupola selector switch 155 in circuit 101 would be in a position causing circuit 103 to be energized, the relay coil 3CR would be energized and its contacts 3CRa and the main control relay contacts 1CRa would cause signal light 30S to be lighted.

If the cupola selector switches 155 and 156 are moved to select cupola 9 as shown in Fig. 3A, circuits 102 and 105 are energized, thus energizing relay coil 2CR and solenoid 1K which is the selector solenoid for connecting cupola 9 to the top pressure controller. The energizing of relay 2CR will cause its contacts 2CRa to be closed to energize the relay circuits 232, 235, 238, and 237, thus energizing relay coils 12Ko, 14Ko, 13Kc, and 15Kc. The energizing of these relay coils will cause the respective contacts 12Koa, 14Koa, 13Kca, and 15Kca, respectively, to energize the solenoids 1Ao, 1Bo, 2Ac, and 2Bc, respectively, to open the dampers 19 and 21 and close the dampers 20 and 22. At the completion of this movement of the selection dampers, the limit switches in the circuits 232 to 239, inclusive, will be as indicated therein. The opening and closing movements of the selection dampers will cause the associated limit switches to be actuated to light signal lights 15S, 17S, 20S, and 22S and extinguish signal lights 16S, 18S, 19S, and 21S, respectively. The energization of the selection relay coil 2CR and de-energization of the coil 3CR will cause signal light 29S to light and signal light 30S to be extinguished, thus indicating the selection of cupola 9 for operation.

The system is now in condition to begin a purge operation. The blast air temperature controller 1C is in a de-energized position and the combustion air damper 36 is closed. The top pressure controller which controls the damper 24 is set on automatic operation by closing switch 170 in circuit 131 to energize relay coil 9CR. The energization of relay coil 9CR will cause contacts 9CRa to close and energize coil 11CR in circuit 132. The energization of coil 11CR causes contacts 11CRa in circuit 132 to close, and will provide a holding circuit for coil 9CR through the contacts 9CRa. It should be noted that switch contacts 13CR2a in circuit 132 are open at this point, and the circuit is completed only by the closed contacts 11TCRa in parallel circuit 133. The contacts 11TCRa are time operated contacts and will open after five seconds operation of the timer associated with those contacts. It is seen therefore that unless switch 13CR2a is closed within the timed operation of contacts 11TCRa, the relay coils 9CR and 11CR will drop out. When the relay coils 9CR and 11CR are energized, their respective contacts 9CRa and 11CRa are closed, thus energizing circuits 245, 246, and 247 to open solenoid coils 10KB, 10KA, and 10KC, respectively. With the solenoid coils 10KA, 10KB, and 10KC energized, the automatic pressure controller 2C will respond to the pressure in the cupola in accordance with its pressure setting, and modulate the operation of the damper motor 24DM to maintain the damper 24 in a position to maintain the desired pressure setting. The opening of the cupola top pressure damper 24 will cause switches 1LS and 2LS to be actuated to light signal light 1S and extinguish signal light 2S to indicate that the pressure control damper is open. The aforementioned actuation of limit switch 2LS in circuit 137 will cause relay coil 14CR to be de-energized, to close contacts 14CRa in circuits 226 and 228, to energize solenoid coils 4K and 6K, to close the relief stack damper 23 and the purge damper 25. The exhaust fan is then started by closing switch 158 in circuit 108. When the exhaust fan is operating the switch 8P in circuit 148 is closed energizing relay 27CR and closing contacts 27CRa in circuit 227 to energize solenoid 5K to close purge damper 48. Limit switch 10LS in circuit 108 is closed by the closed combustion air damper. Limit switches 13LS, 1LS, and 4LS, respectively, are closed by the open damper 33, the open damper 24, and the closed damper 23, respectively. The relay contacts 17CRa and 26CRa in the circuit 108 are closed by the energization of circuits 140 and 147 as previously described. It is thus seen that the closing of switch 158 will energize circuit 108 through the relay coil 1MCR. The energization of relay coil 1MCR will cause relay contacts 1MCRa in circuit 110 to close a holding circuit around the starting switch 158, and relay contacts 1MCRa in circuit 251 to close, thus completing the circuit to the exhaust fan motor 1M. The closing of contacts 1MCRa also completes circuit 141 to energize relay coil 20CR and close holding contacts 20CRa in circuit 109 which bypasses the limit switches 10LS, 13LS, 1LS, and 4LS in circuit 108.

At this point consider the condition of the "dump" circuit 134. Contacts 9CRa are closed by the energization of circuit 131. Contacts 22CRa, 26CRa, 25CRa, 24CRa, 17CRa, 16CRa, and 14CRa are all closed by the energization of circuits 143, 147, 148, 146, 145, 140, 139, and 137, respectively, those circuits having been previously described as being energized. Circuit 134 therefore requires only the closing of relay contacts 27CRa to be completed. When the exhaust fan is started by the energization of the fan motor 1M, the suction pressure switch 8P senses the normal operation of the fan and will close to complete circuit 148 for energizing the relay coil 27CR. The energization of circuit 148 as just described will cause relay contacts 27CRa to close, and thus energize circuit 134 and relay coils 13CR1 and 13CR2. The energization of the relay coils 13CR1 and 13CR2 will cause the actuation of their respective relay contacts 13CR1a and 13CR2a in the various circuits in which those contacts are located. The closing of the relay contacts 13CR2a in circuit 132 establishes a holding circuit for the relay coils 11CR and 9CR independently of the time controlled contacts 11TCRa. The closing of relay contacts 13CRa and 27CRa in circuit 111 effect the energization of timer circuits 113, 114, and 115. The timer 11TCR in circuit 113 immediately begins to operate and after five seconds opens the contacts 11TCRa in circuit 133. Circuits 114 and 115 are associated in that the coils 1TM and 1TCL of the timer motor and timer clutch, respectively, must both be operated in order for that timer to function. The energizing of the clutch coil 1TCL causes contacts 1TCLa to close and energize the coil 1TM in circuit 114. After a predetermined time required for the purging operation, the timer 1TM will cause the contacts 1TMa in circuit 117 to close and energize the relay coil 10CR. The energization of the relay coil 10CR will cause contacts 10CRa in circuit 201 to be closed and lights 27S and 27aS to be lit indicating the completion of the purge cycle.

Contacts 10CRa are also closed in circuit 116 to prepare that circuit for lighting the pilot burner. When the top pressure controller was first set on "automatic" the signal lights 42S, 1S, 4S, 6S, and 8S were lit and signal lights 2S, 3S, 5S, and 7S were extinguished. During the timed purging operation the signal lights 23S and 37S were lit to indicate that the exhaust fan was operating and that the purge was in progress. At the completion of the purging operation, the signal lights 27S and 27aS were lit to indicate that the purge was completed and the combustion unit burners ready to be lighted. Whenever it is desired to set the top pressure controller for manual operation the switch 171 in circuit 131 is opened. This de-energizes the relay coil 9CR but leaves the coil 11CR energized through its circuit 132. Upon de-energization of the coil 9CR, the circuit 245 is de-energized and the solenoid 10KB is de-energized. The de-energization of the solenoid 10KB causes the control air to be shunted around the controller 2C and through the manual pressure controller 39. The manual controller 39 is then set to maintain a predetermined position of the damper 24. During the purging operation the controller is maintained on "automatic" and is set to maintain a predetermined desirable pressure. With the purge cycle completed and the top pressure controller set for automatic operation, the system is now in condition for the pilot burner to be ignited. The pilot burners are ignited by closing the switch 162 in circuit 116. It should be noted that this circuit cannot be energized unless the relay contacts 10CRa are closed by the purge timer circuit. When circuit 116 is energized, relay coil 5CR is energized and its contacts 5CRa are closed in circuits 231 and 248. When circuit 231 is energized, the valve of solenoid coil 11K is opened to allow gas to flow to the burner openings 42. The gas at the burner 42 is ignited by the ignition spark 268 which is energized by the circuit 248. The main safety shut-off gas valve is a valve of the "manual reset" type. This valve is manually opened and is held open by a solenoid operated latch. The solenoid 8K is operable in response to flame at the gas burner to hold open the safety shut-off valve providing sufficient gas pressure is present to close switch 10P. If the gas is ignited properly at the burner 42, the various flame detectors in circuit 118 will close their respective switches and complete this circuit for the relay coils 6CR1 and 6CR2. When the relays 6CR1 and 6CR2 are energized, their respective contacts are closed in the various control circuits in which they are located. The contacts 6CR1a in circuit 230 are operable upon closing to energize the solenoid 8K which holds the latch opening the main safety shut-off gas valve. This main gas valve is subject to the continued energization of the relay 6CR1 which, in turn, is subject to the continued presence of flame at the burner. Upon release of the pilot ignition 162, the pilot valve solenoid 11K is de-energized by the breaking of circuit 116. The closing of relay contact 6CRa in circuit 144 is operable to energize relay coil 23CR. The closing of relay contacts 23CRa is effective to energize circuit 241 to open the solenoid valve 17K. The valve 17K, as described in connection with Fig. 2, is a valve which permits a large quantity of gas to flow to the burner 42a for a high fire operation. When the valve 17K is closed, only a low fire flame is maintained through the by-pass around valve 17K. At this point of the operation, the cupola is lighted to commence its melting operation. The soot clower circuit is then energized by closing switch 173 in circuit 153. The closing of switch 173 causes the relay coil 4MCR to be energized. The relay coil 4MCR causes contacts 4MCRa in circuits 154 and 252 to close. These relay contacts by-pass the starting switch 173 in circuit 153 and cause the soot blower motor 4M to be energized in circuit 252. When the soot blower compressor has built up a predetermined pressure the switch 9P will close and energize relay 30CR to indicate proper operation of the soot blower.

The cupola top pressure controller which was set for automatic operation is adjusted to maintain the desired burning rate with only the exhaust fan 1B operating to supply air to the cupola. The blast air weight controller 5C is set to maintain the damper 32 in a position to supply a predetermined desired blast air quantity to the cupola. The controller 5C could also be arranged to control air weight by controlling the speed of the fan motor 3M. The blast air blower is now started by closing the starting switch 164 in circuit 122. This circuit energizes relay coil 3MCR and causes contacts 3MCRa in circuit 249 and in circuit 121 to close. Circuit 249, when energized, causes the blast air blower motor 3M to operate. The blast air blower circuit 122 includes relay contacts 6CR1a controlled by the flame responsive circuit 118, and relay contacts 25CRa controlled by the cooling water flow switch 5P. The circuit 123 is a holding circuit including relay contacts 15CRa controlled by the pressure switch 7P responsive to the blast air pressure and relay contacts 3MCRa connected in parallel with starting switch 164 and relay contacts 6CR1a in circuit 122. The energization of the blast air blower relay 3MCR also causes circuit 229 to be energized, thus causing solenoid 7K to close the by-pass damper 33 to the blast air blower 3B. With this operation, the signal lights 25S and 14S will be lit and signal light 13S will be extinguished to indicate that the blast air blower is on, and that the blast air by-pass damper is closed.

The hot blast system is now in condition to be set in operation. The combustion air blower is started by closing switch 162a in circuit 120. This is operable to energize relay coil 2MCR which causes the combustion air blower motor circuit 250 to be energized. The combustion air blower circuit 120 is subject to the control by the flame responsive relay contacts 6CRa and the dump circuit relay contacts 13CRa. Circuit 121 provides the circuit 120 with a holding circuit by-passing the starting switch 162 and includes relay contacts 29CRa responsive to combustion air pressure switch 11P in circuit 150. The holding circuit 121 is also controlled by blast air blower relay contacts 3MCRa. With the energization of the combustion air blower circuit, the signal light 24S will light to indicate that the combustion air blower is turned on. The blast air temperature controller is now set for a predetermined hot blast temperature and controls the combustion air damper 36. The blast temperature controller is set for manual operation by closing the starting switch 166 in circuit 124. The closing of switch 166 will cause the relay coil 8CR to be energized. The energization of relay 8CR causes relay contacts 8CR$_a$ in circuit 125 to establish a holding circuit around the starting switch 166. The relay 8CR also causes contacts 8CR$_a$ in circuits 243 and 244 to be closed to energize the solenoids 9KA and 9KC to place the blast air temperature controller in condition for manual operation. The manual controller 37 can then be adjusted to cause the damper motor 36DM to open the damper 36 to a predetermined setting. If flame is established in the burner, the manual blast temperature controller is then adjusted to gradually increase the opening of the combustion air damper 36 over a period of time to bring the blast temperature to near the setting of the controller. When the combustion temperature approaches the setting of the controller, it may be switched to automatic operation by closing the switch 168 in the circuit 128. The energizing of circuit 128 will cause the relay coil 7CR1 to energize circuit 242 and open solenoid 9KB to place the blast temperature controller 1C on automatic operation. The hot blast system will then continue to operate as long as it is desired to supply the cupola with hot blast air.

Following the operation of cupola to melt down its charge, the cupola and hot blast unit may be ventilated by the exhaust fan 1B. To accomplish this ventilation of the cupola system, the blast air blower is turned off by opening the stopping switch 165. This will stop the blast air blower by deenergizing the relay coil 3MCR. The de-energization of relay coil 3MCR also causes circuit 121 to be opened and stops operation of the combustion air blower by de-energizing its relay coil 2MCR.

If it is desired to provide a forced ventilation of only the hot blast unit the ventilation switch 157 in circuit 107 may be turned on. This will energize relay coil 4CR and hold in the relay 1MCR through holding circuits 160 and 161. The energization of relay coil 4CR will also cause contacts 4CR$_a$ in circuit 100 to be opened, thus de-energizing the relay coil 1CR. The de-energization of relay coil 1CR causes its contacts 1CR$_a$ to be opened, thus de-energizing the entire control circuit except for the exhaust fan itself and circuit 148 controlling the purge damper 48. When the control relay 1CR is de-energized and the various control circuits are de-energized therewith, the top pressure damper 24 closes, the relief damper 23 and purge damper 25 open, the main gas valve closes, and the soot blower stops its operation.

If it is desired to provide a convection ventilation of the cupola and hot blast unit, the ventilation switch 157 is then turned off to stop the exhaust fan. When the exhaust fan stops, circuit 148 is de-energized thus allowing damper 48 to open. The cupola is then vented by the open blast by-pass damper 33 and the open relief stack damper 23. The combustion unit is vented by the open purge dampers 25 and 48. The dust unit is vented by the open air damper 55 and its discharge stack. After the entire system has cooled sufficiently, the various water and air valves may be turned off until further operation of the system is required.

It should be noted that the various control circuits which have just been described are inter-related to a large degree and are subject to control by various controllers and control switches. Some of these controls are "permissives" which must be operated before the particular circuit can be energized. There are also "drop-out" controls which are both permissive in nature and also are operable to de-energize the particular circuit by the loss of that particular control function. There are also provided bridging or holding circuits which by-pass "permissives" or manual switches to hold in certain relays.

The inlet and outlet dampers to the cupolas 9 and 10 control limit switches which dominate the main control relay 1CR so that if any of these dampers fails to reach its proper position or should move out of position during operation, the entire system would be shut down. The cupola top pressure controller is subject to a "drop-out" timer relay 11TCR$_a$ in its starting circuit and during operation is subject to the "dump" relay contacts 13CR2$_a$.

The exhaust fan is subject to permissives 10LS, combustion air damper closed, 13LS, blast air by-pass open, 1LS, pressure control damper open, and 4LS, relief stack damper closed. The exhaust fan is also subject to relays 17CR and 26CR which are controlled by dust unit exhaust temperature and dust unit water flow, respectively. The aforementioned "permissive" limit switches in the exhaust fan circuit are by-passed by a holding circuit including relay contacts 20CR$_a$. The holding relay 20CR is in turn subject to a "permissive" relay 16CR controlled by temperature at the combustion unit heat exchanger, said permissive being by-passed by relay contacts 20CR$_a$ when the relay 20CR is energized. It is thus seen that the operation of the various control dampers and the initiation of operation of the top pressure controller is a pre-requisite or permissive to the energization of the exhaust fan.

The exhaust fan suction pressure relay 27CR and the "dump" relays 13CR1 and 13CR2 operate as permissives for the energization of the purge timing motor circuit, the pilot ignition relay circuit, and the gas burner flame detection circuit. The permissives 13CR$_a$ and 27CR$_a$ are by-passed by the flame detection relay contacts 6CR1$_a$ in the holding circuit 112. The operation of the pilot ignition circuit 118 is in turn a pre-requisite to the operation of the main gas valve circuit 230.

Similarly the recognition of flame which is required to hold in the flame relays 6CR1 and 6CR2 is a pre-requisite to the energization of the blast air blower and the combustion air blower circuits 122 and 121, respectively. The blast air blower circuit 122 is also subject to a "drop-out" switch 25CR$_a$ which is responsive to flow of cooling water. The combustion air blower is subject to the flame relay 6CR2 and the "dump" relay 13CR2 and has a holding circuit by-passing the manual switch 162 which includes relay contacts 3MCR$_a$ controlled by the blast air blower relay 3MCR. The blast air temperature controller is subject to control by the cooling water relay 25CR, the blast air temperature limiting relay 12CR, and the combustion air pressure responsive relay 29CR.

The "dump" relay circuit 134 includes switches responsive to combustion unit heat exchanger temperature, dust unit temperature, control air pressure, cooling water flow, exhaust fan operation, open position of the pressure control damper, and dust unit water flow. This circuit also includes permissives responsive to the energization of the relay 9CR, controlled by the top pressure controller, and relay 22CR which is controlled by air and water pressure switches 3P and 4P, these permissives being by-passed by a holding circuit including contacts 13CR1$_a$. The dump relays 13CR1 and 13CR2 control the blast air temperature controller, the cupola top pressure controller, the combustion air blower, and the flame relay circuit. The dump relay 13CR through its control of the cupola top pressure controller is operable to close the pressure controlled damper 24 and open the stack damper 23 and purge dampers 25 for emergency dumping of exhaust gases to atmosphere upon failure of any of the control functions affecting the dump relay circuit. A failure of operation of the exhaust fan will, in addition to the aforementioned "dump" operation, cause the damper 48 to open.

It should be noted from the foregoing description that the control circuits are inter-related so that certain control functions must be performed before the next successive control function can be performed. This is accomplished by the arrangement of "permissive" and "drop-out" controls which must be operated before a particular control circuit can be energized. It should also be noted that many control functions are bridged by emergency drop-out controls so that the entire system will go to a safety operation upon failure of certain desired control functions. It should also be noted that all of the dampers in this system which are controlled by the various controls are weighted or otherwise biased toward a safe operating position so that upon failure of the control system to operate properly, for any reason, these dampers will fail in a safe position.

Having thus described the invention, what is claimed and is desired to be secured by Letters Patent of the United States is:

1. A method of operating a system of apparatus comprising a cupola, a combustion unit having a heat exchanger therein, connected in series; comprising purging the system with air for a predetermined time, lighting a pilot flame in the combustion unit, lighting the charge in the cupola, supplying air through said heat exchanger into said cupola, conducting combustion products from said cupola to said combustion unit, burning the residual CO in said combustion products to heat the air passing through said heat exchanger, and limiting the combustion temperature adjacent said heat exchanger by introducing water into said combustion unit.

2. A method of operating a system of apparatus comprising a cupola, a combustion unit having a heat exchanger therein, and a dust collector unit connected in series; comprising purging the system with air for a predetermined time, lighting a pilot flame in the combustion unit, lighting the charge in the cupola, supplying air through said heat exchanger into said cupola, conducting combustion products from said cupola to said combustion unit, burning the residual CO in said combustion products to heat the air passing through said heat exchanger, limiting the combustion temperature adjacent said heat exchanger by introducing water into said combustion unit, and conducting said combustion products to said dust collector unit and separating foreign particles carried therein.

3. A method of operating a system of apparatus comprising a cupola, a combustion unit having a heat exchange therein, and a dust collector unit connected in series; comprising purging the system with air for a predetermined time, lighting a pilot flame in the combustion unit, lighting the charge in the cupola, supplying air through said heat exchanger into said cupola, conducting combustion products from said cupola to said combustion unit, burning the residual CO in said combustion products to heat the air passing through siad heat exchanger, limiting the combustion temperature adjacent said heat exchanger by introducing water into said combustion unit, conducting said combustion products to said dust collector unit and separating foreign particles carried therein, and discharging said combustion products to atmosphere prior to their reaching said combustion unit upon occurrence of a predetermined unsafe condition of operation.

4. A method of operating a system of apparatus comprising a cupola, a combustion unit having a heat exchanger therein, and a dust collector unit connected in series; comprising purging the system with air for a predetermined time, lighting a pilot flame in the combustion unit, lighting the charge in the cupola, supplying air through said heat exchanger into said cupola, conducting combustion products from said cupola to said combustion unit, supplying air to said combustion unit to burn the residual CO in combustion products passing therethrough, regulating the air supply to said combustion unit to maintain said cupola air supply at a constant temperature, limiting the combustion temperature adjacent said heat exchanger by introducing water into said combustion unit, and conducting said combustion products to said dust collector unit and separating foreign particles carried therein.

5. A method of operating a system of apparatus comprising a cupola, a combustion unit having a heat exchanger therein, and a dust collector unit connected in series; comprising purging the system with air for a predetermined time, lighting a pilot flame in the combustion unit, lighting the charge in the cupola, supplying air through said heat exchanger into said cupola, conducting combustion products from said cupola to said combustion unit, supplying air to said combustion unit to burn the residual CO in combustion products passing therethrough, regulating the air supply to said combustion unit to maintain said cupola air supply at a constant temperature, limiting the combustion temperature adjacent said heat exchanger by introducing water into said combustion unit, conducting said combustion products to said dust collector unit and separating foreign particles carried therein, and discharging said combustion products to atmosphere prior to their reaching said combustion unit upon occurrence of a predetermined unsafe condition of operation.

6. A method of operating a system of apparatus comprising a cupola, a combustion unit having a heat exchanger therein, and a dust collector unit connected in series; comprising purging the system with air for a predetermined time, lighting a pilot flame in the combustion unit, lighting the charge in the cupola, supplying air through said heat exchanger into said cupola, conducting combustion products from said cupola to said combustion unit, supplying air to said combustion unit to burn the residual CO in combustion products passing therethrough, regulating the air supply to said combustion unit to maintain said cupola air supply at a constant temperature, limiting the combustion temperature adjacent said heat exchanger by introducing water into said combustion unit, conducting said combustion products to said dust collector unit and separating foreign particles carried therein, discharging said combustion products to atmosphere prior to their reaching said combustion unit upon occurrence of a predetermined unsafe condition of operation, and supplying cooling air through said combustion unit following a melting operation in said cupola.

7. In an apparatus of the character described, a cupola having an air inlet and an outlet for combustion products, a combustion unit having an inlet connected to said cupola outlet, a dust collector unit having an inlet and outlet, said combustion unit having an outlet connected to said collector unit inlet, a heat exchanger positioned across said combustion unit and having an inlet and outlet, a blast air blower connected to said heat exchanger inlet, said heat exchanger outlet being connected to said cupola air inlet, an induced draft fan connected to said dust collector unit outlet, a blower connected to said combustion unit to supply air thereto for combustion of residual CO in cupola exhaust gases, a pilot burner in said combustion unit, means to operate said induced draft fan to purge said apparatus with air for a predetermined time, means to ignite a flame at said pilot burner and having an initial inoperative position, means responsive to said predetermined purging operation by said induced draft fan to render said ignition means operative, means to energize said blast air blower to supply air to said cupola through said heat exchanger and having an initial inoperative position, means responsive to the occurrence of flame at said pilot burner to render said blower energizing means operative, means to energize said combustion air blower and having an initial inoperative position, and means to render operative said last named blower energizing means in response to the presence of flame in said combustion unit and the prior operation of said blast air blower.

8. In an apparatus of the character described, a cupola having an air inlet and an outlet for combustion products, a combustion unit having an inlet connected to said cupola outlet, a dust collector unit having an inlet and outlet, said combustion unit having an outlet connected to said collector unit inlet, a heat exchanger positioned across said combustion unit and having an inlet and outlet, a blast air blower connected to said heat exchanger inlet, said heat exchanger outlet being connected to said cupola air inlet, an induced draft fan connected to said dust collector unit outlet, a blower connected to said combustion unit to supply air thereto for combustion of residual CO in cupola exhaust gases, a pilot burner in said combustion unit, means to operate said induced draft fan to purge said apparatus with air for a predetermined time, means to ignite a flame at said pilot burner and having an initial inoperative position, means responsive to said predetermined purging operation by said induced draft fan to render said ignition means operative, means to energize said blast air blower to supply air to said cupola through said heat exchanger and having an initial inoperative position, means responsive to the occurrence of flame at said pilot burner to render said blower energizing means operative, means to energize said combustion air blower and having an initial inoperative position, means to render operative said last named blower energizing means in response to the presence of flame in said combustion unit and the prior operation of said blast air blower, and thermostatic means responsive to the temperature of air at said cupola air inlet and operable to vary the amount of air supplied to said combustion unit to maintain a predetermined cupola air inlet temperature.

9. In an apparatus of the character described, a cupola having an air inlet and an outlet for combustion products, a combustion unit having an inlet connected to said cupola outlet, a dust collector unit having an inlet and outlet, said combustion unit having an outlet connected to said collector unit inlet, a heat exchanger positioned across said combustion unit and having an inlet and outlet, a blast air blower connected to said heat exchanger inlet, said heat exchanger outlet being connected to said cupola air inlet, an induced draft fan connected to said dust collector unit outlet, a blower connected to said combustion unit to supply air thereto for combustion of residual CO in cupola exhaust gases, a pilot burner in said combustion unit, means to operate said induced draft fan to purge said apparatus with air for a predetermined time, means to ignite a flame at said pilot burner and having an initial inoperative position, means responsive to said predetermined purging operation by said induced draft fan to render said ignition means operative, means to energize said blast air blower to supply air to said cupola through said heat exchanger and having an initial inoperative position, means responsive to the occurrence of flame at said pilot burner to render said blower energizing means operative, means to energize said combustion air blower and having an initial inoperative position, means to render operative said last named blower energizing means in response to the presence of flame in said combustion unit and the prior operation of said blast air blower, thermostatic means responsive to the temperature of air at said cupola air inlet and operable to vary the amount of air supplied to said combustion unit to maintain a predetermined cupola air inlet temperature, and thermostatic means responsive to temperature adjacent said heat exchanger to supply water to said combustion chamber to limit the temperature therein to a predetermined maximum value.

10. In an apparatus of the character described, a cupola having an air inlet and an outlet for combustion products, a combustion unit having an inlet connected to said cupola outlet, a relief stack connected between said cupola and said combustion unit and having a normally closed damper, a normally open damper positioned between said relief stack and said combustion unit inlet, means to operate said dampers conjointly, a dust collector unit having an inlet and outlet, said combustion unit having an outlet connected to said collector unit inlet, a heat exchanger positioned across said combustion unit and having an inlet and outlet, a blast air blower connected to said heat exchanger inlet, said heat exchanger outlet being connected to said cupola air inlet, an induced draft fan connected to said dust collector unit outlet, a blower connected to said combustion unit to supply air thereto for combustion of residual CO in cupola exhaust gases, a pilot burner in said combustion unit, means to operate said induced draft fan to purge said apparatus with air for a predetermined time, means to ignite a flame at said pilot burner and having an initial inoperative position, means responsive to said predetermined purging operation by said induced draft fan to render said ignition means operative, means to energize said blast air blower to supply air to said cupola through said heat exchanger and having an initial inoperative position, means responsive to the occurrence of flame at said pilot burner to render said blower energized means operative, means to energize said combustion air blower and having an initial inoperative position, means to render operative said last named blower energizing means in response to the presence of flame in said combustion unit and the prior operation of said blast air blower, and means responsive to a predetermined unsafe operating condition of said apparatus to actuate said damper operating means to open said relief stack damper and close said combustion inlet damper.

11. In an apparatus of the character described, a cupola having an air inlet and an outlet for combustion products, a combustion unit having an inlet connected to said cupola outlet, a relief stack connected between said cupola and said combustion unit and having a normally closed damper, a normally open damper positioned between said relief stack and said combustion unit inlet, means to operate said dampers conjointly, a dust collector unit having an inlet and outlet, said combustion unit having an outlet connected to said collector unit inlet, a heat exchanger positioned across said combustion unit and having an inlet and outlet, a blast air blower connected to said heat exchanger inlet, said heat exchanger outlet being connected to said cupola air inlet, an induced draft fan connected to said dust collector unit outlet, a blower connected to said combustion unit to supply air thereto for combustion of residual CO in cupola exhaust gases, a pilot burner in said combustion unit, means to operate said induced draft fan to purge said apparatus with air for a predetermined time, means to ignite a flame at said pilot burner and having an initial inoperative position, means responsive to said predetermined purging operation by said induced draft fan to render said ignition means operative, means to energize said blast air blower to supply air to said cupola through said heat exchanger and having an initial inoperative position, means responsive to the occurrence of flame at said pilot burner to render said blower energizing means operative, means to energize said combustion air blower and having an initial inoperative position, means to render operative said last named blower energizing means in response to the presence of flame in said combustion unit and the prior operation of said blast air blower, thermostatic means responsive to the temperature of air at said cupola air inlet and operable to vary the amount of air supplied to said combustion unit to maintain a predetermined cupola air inlet temperature, thermostatic means responsive to temperature adjacent said heat exchanger to supply water to said combustion chamber to limit the temperature therein to a predetermined maximum value, and means responsive to a predetermined unsafe operating condition of said apparatus to actuate said damper operating means to open said relief stack damper and close said combustion inlet damper.

12. In an apparatus of the character described, a cupola having an air inlet and an outlet for combustion products, a combustion unit having an inlet connected to said cupola outlet, a relief stack connected between said cupola and said combustion unit and having a normally closed damper, a normally open damper positioned between said relief stack and said combustion unit inlet, means responsive to pressure in said cupola to operate said combustion unit inlet damper to maintain a predetermined back pressure therein, electric means to operate said dampers and electrically connected for reverse conjoint operation of said dampers, a dust collector unit having an inlet and outlet, said combustion unit having an outlet connected to said collector unit inlet, a heat exchanger positioned across said combustion unit and having an inlet and outlet, a blast air blower connected to said heat exchanger inlet, said heat exchanger outlet being connected to said cupola air inlet, an induced draft fan connected to said dust collector unit outlet, a blower connected to said combustion unit to supply air thereto for combustion of residual CO in cupola exhaust gases, a pilot burner in said combustion unit, means to operate said induced draft fan to purge said apparatus with air for a predetermined time, means to ignite a flame at said pilot burner and having an initial inoperative position, means responsive to said predetermined purging operation by said induced draft fan to render said ignition means operative, means to energize said blast air blower to supply air to said cupola through said heat exchanger and having an initial inoperative position, means responsive to the occurrence of flame at said pilot burner to render said blower energizing means operative, means to energize said combustion air blower and having an initial inoperative position, means to render operative said last named blower energizing means in response to the presence of flame in said combustion unit and the prior operation of said blast air blower, and means responsive to a predetermined unsafe operating condition of said apparatus to actuate said damper operating means to open said relief stack damper and close said combustion inlet damper.

13. In an apparatus of the character described, a cupola having an air inlet and an outlet for combustion products, a combustion unit having an outlet and a combustion air inlet and having an inlet connected to said cupola outlet, dust collector having an outlet and having an inlet connected to said combustion unit outlet, a heat exchanger positioned in said combustion unit and having an inlet and having an outlet connected to said cupola air inlet, a blast air blower connected to said heat exchanger inlet for supplying heated blast air to said cupola, an induced draft fan connected to said collector outlet, a blower connected to said combustion air inlet to supply air for combustion of residual CO in cupola exhaust gases, a pilot burner in said combustion unit, an electric circuit for said induced draft fan including an electric timer operable to cause said fan to purge said apparatus with air for a predetermined time, an electric circuit including an electric fuel valve and electric igniter for lighting a flame at said pilot burner, said last named circuit including a switch having initially open contacts closable by said timer to permit pilot ignition only after completion of said predetermnied purging, an electric circuit for said blast air blower including electric flame responsive means operable to prevent energization thereof in the absence of flame at said pilot burner, an electric circuit for said combustion air blower including said flame responsive means and an initially open switch closable in response to energization of said blast air blower circuit, and said last named circuit being energizable only when said pilot burner and said blast air blower are both in normal operation.

14. In an apparatus of the character described, a cupola having an air inlet and an outlet for combustion products, a combustion unit having an outlet and a combustion air inlet and having an inlet connected to said cupola outlet, dust collector having an outlet and having an inlet connected ot said combustion unit outlet, a heat exchanger positioned in said combustion unit and having an inlet and having an outlet connected to said cupola air inlet, a blast air blower connected to said heat exchanger inlet for supplying heated blast air to said cupola, an induced draft fan connected to said collector outlet, a blower connected to said combustion air inlet to supply air for combustion of residual CO in cupola exhaust gases, a pilot burner in said combustion unit, an electric circuit for said induced draft fan including an electric timer operable to cause said fan to purge said apparatus with air for a predetermined time, an electric circuit including an electric fuel valve and electric igniter for lighting a flame at said pilot burner, said last named circuit including a switch having initially open contacts closable by said timer to permit pilot ignition only after completion of said predetermined purging, an electric circuit for said blast air blower including electric flame responsive means operable to prevent energization thereof in the absence of flame at said pilot burner, an electric circuit for said combustion air blower including said flame responsive means and an initially open switch closable in response to energization of said blast air blower circuit, said last named circuit being energizable only when said pilot burner and said blast air blower are both in normal operation, a damper controlling air flow from said combustion air blower, and thermostatic means responsive to blast air temperature at said cupola air inlet operable to modulate said damper to control the amount of combustion in said combustion unit and maintain a predetermined blast air temperature.

15. In an apparatus of the character described, a cupola having an air inlet and an outlet for combustion products, a combustion unit having an outlet and a combustion air inlet and having an inlet connected to said cupola outlet, dust collector having an outlet and having an inlet connected to said combustion unit outlet, a heat exchanger positioned in said combustion unit and having an inlet and having an outlet connected to said cupola air inlet, a blast air blower connected to said heat exchanger inlet for supplying heated blast air to said cupola, an induced draft fan connected to said collector outlet, a blower connected to said combustion air inlet to supply air for combustion of residual CO in cupola exhaust gases, a pilot burner in said combustion unit, an electric circuit for said induced draft fan including an electric timer operable to cause said fan to purge said apparatus with air for a predetermined time, an electric circuit including an electric fuel valve and electric igniter for lighting a flame at said pilot burner, said last named circuit including a switch having initially open contacts closable by said timer to permit pilot ignition only after completion of said predetermined purging, an electric circuit for said blast air blower including electric flame responsive means operable to prevent energization thereof in the absence of flame at said pilot burner, an electric circuit for said combustion air blower including said flame responsive means and an initially open switch closable in response to energization of said blast air blower circuit, said last named circuit being energizable only when said pilot burner and said blast air blower are both in normal operation, a damper controlling air flow from said combustion air blower, thermostatic means responsive to blast air temperature at said cupola air inlet operable to modulate said damper to control the amount of combustion in said combustion unit and maintain a predetermined blast air temperature, a water supply conduit opening into the upper portion of said combustion unit, and a thermostatically operated valve controlling flow of water in response to temperature adjacent said heat exchange to supply water to limit the combustion chamber temperature adjacent said heat exchanger to a predetermined maximum value.

16. In an apparatus of the character described, a cupola having an air inlet and an outlet for combustion products, a combustion unit having an outlet and a combustion air inlet and having an inlet connected to said cupola outlet, a relief stack connected between said cupola and said combustion unit for emergency dumping of exhaust gases and having a normally closed damper, a normally open damper positioned between said relief stack and said combustion unit inlet, an electric circuit including means operable to effect a reverse conjoint operation of said dampers, a dust collector having an outlet and having an inlet connected to said combustion unit outlet, a heat exchanger positioned in said combustion unit and having an inlet and having an outlet connected to said cupola air inlet, a blast air blower connected to said heat exchanger inlet for supplying heated blast air to said cupola, an induced draft fan connected to said collector outlet, a blower connected to said combustion air inlet to supply air for combustion of residual CO in cupola exhaust gases, a pilot burner in said combustion unit, an electric circuit for said induced draft fan including an electric timer operable to cause said fan to purge said apparatus with air for a predetermined time, an electric circuit including an electric fuel valve and electric igniter for lighting a flame at said pilot burner, said last named circuit including a switch having initially open contacts closable by said timer to permit pilot ignition only after completion of said predetermined purging, an electric circuit for said blast air blower including electric flame responsive means operable to prevent energization thereof in the absence of flame at said pilot burner, an electric circuit for said combustion air blower including said flame responsive means and an initially open switch closable in response to energization of said blast air blower circuit, said last named circuit being energizable only when said pilot burner and said blast air blower are both in normal operation, and means including one or more automatically operated safety switches responsive to one or more predetermined unsafe conditions of operation of said apparatus to actuate said damper controlling circuit to open said relief stack damper and close said combustion unit inlet damper.

17. In an apparatus of the character described, a cupola having an air inlet and an outlet for combustion products, a combustion unit having an outlet and a combustion air inlet and having an inlet connected to said cupola outlet, dust collector having an outlet and having an inlet connected to said combustion unit outlet, a heat exchanger positioned in said combustion unit and having an inlet and having an outlet connected to said cupola air inlet, a blast air blower connected to said heat exchanger inlet for supplying heated blast air to said cupola, an induced draft fan connected to said collector outlet, a blower connected to said combustion air inlet to supply air for combustion of residual CO in cupola exhaust gases, a pilot burner in said combustion unit, an electric circuit for said induced draft fan including an electric timer operable to cause said fan to purge said apparatus with air for a predetermined time, an electric circuit including an electric fuel valve and electric igniter for lighting a flame at said pilot burner, said last named circuit including a switch having initially open contacts closable by said timer to permit pilot ignition only after completion of said predetermined purging, an electric circuit for said blast air blower including electric flame responsive means operable to prevent energization thereof in the absence of flame at said pilot burner, an electric circuit for said combustion air blower including said flame responsive means and an initially open switch closable in response to energization of said blast air blower circuit, said last named circuit being energizable only when said pilot burner and said blast air blower are both in normal operation, a second energizing circuit for said induced draft fan including a switch controlling all of the aforementioned energizing circuits, and means to energize said second fan circuit to deenergize all other circuits and operate said fan for ventilation of said apparatus.

18. In an apparatus of the character described, a cupola having an air inlet and an outlet for combustion products, a combustion unit having an outlet and a combustion air inlet and having an inlet connected to said cupola outlet, a relief stack connected between said cupola and said combustion unit for emergency dumping of exhaust gases and having a normally closed damper, a normally open damper positioned between said relief stack and said combustion unit inlet, means responsive to pressure in said cupola to modulate said combustion unit inlet damper to maintain a predetermined back pressure therein, electric means controlling said pressure responsive means to close said combustion unit inlet damper, electric means to open and close said relief stack damper, an electric circuit for said electric means operable to effect a reverse conjoint operation of said dampers, a dust collector having an outlet and having an inlet connected to said combustion unit outlet, a heat exchanger positioned in said combustion unit and having an inlet and having an outlet connected to said cupola air inlet, a blast air blower connected to said heat exchanger inlet for supplying heated blast air to said cupola, an induced draft fan connected to said collector outlet, a blower connected to said combustion air inlet to supply air for combustion of residual CO in cupola exhaust gases, a pilot burner in said combustion unit, an electric circuit for said induced draft fan including an electric timer operable to cause said fan to purge said apparatus with air for a predetermined time, an electric circuit including an electric fuel valve and electric igniter for lighting a flame at said pilot burner, said last named circuit including a switch having initially open contacts closable by said timer to permit pilot ignition only after completion of said predetermined purging, an electric circuit for said blast air blower including electric flame responsive means operable to prevent energization thereof in the absence of flame at said pilot burner, an electric circuit for said combustion air blower including said flame responsive means and an initially open switch closable in response to energization of said blast air blower circuit, and said last named circuit being energizable only when said pilot burner and said blast air blower are both in normal operation, and means including one or more automatically operated safety switches responsive to one or more predetermined unsafe conditions of operation of said apparatus to actuate said damper controlling circuit to open said relief stack damper and close said combustion unit inlet damper.

19. In an apparatus of the character described, a cupola having an air inlet and outlet for combustion products, a combustion unit having an outlet and a combustion air inlet and having an inlet connected to said cupola outlet, a relief stack connected between said cupola and said combustion unit for emergency dumping of exhaust gases and having a normally closed damper, a normally open damper positioned between said relief stack and said combustion unit inlet, an electric circuit including means operable to effect a reverse conjoint operation of said dampers, a dust collector having an outlet and having an inlet connected to said combustion unit outlet, a heat exchanger positioned in said combustion unit and having an inlet and having an outlet connected to said cupola air inlet, a blast air blower connected to said heat exchanger inlet for supplying heated blast air to said cupola, an induced draft fan connected to said collector outlet, a blower connected to said combustion air inlet to supply air for combustion of residual CO in cupola exhaust gases, a pilot burner in said combustion unit, an electric circuit for said induced draft fan including an electric timer operable to cause said fan to purge said apparatus with air for a predetermined time, an electric circuit including an electric fuel valve and electric igniter for lighting a flame at said pilot burner, said last named circuit including a switch having initially open contacts closable by said timer to permit pilot ignition only after completion of said predetermined purging, an electric circuit for said blast air blower including electric flame responsive means operable to prevent energization thereof in the absence of flame at said pilot burner, an electric circuit for said combustion air blower including said flame responsive means and an initially open switch closable in response to energization of said blast air blower circuit, said last named circuit being energizable only when said pilot burner and said blast air blower are both in normal operation, a damper controlling air flow from said combustion air blower, thermostatic means responsive to blast air temperature at said cupola air inlet operable to modulate said damper to control the amount of combustion in said combustion unit and maintain a predetermined blast air temperature, a water supply conduit opening into the upper portion of said combustion unit, a thermostatically operated valve controlling flow of water in response to temperature adjacent said heat exchanger to supply water to limit the combustion chamber temperature adjacent said heat exchanger to a predetermined maximum value, and means including one or more automatically operated safety switches responsive to one or more predetermined unsafe conditions of operation of said apparatus to actuate said damper controlling circuit to open said relief stack damper and close said combustion unit inlet damper.

20. An apparatus as defined in claim 19 in which the various control dampers are pneumatically operated and water cooled and the collector is of the water scrubber type, the combustion unit and collector are provided with thermal limit switches; and the damper controlling circuit include switches responsive to pneumatic control air pressure, cooling water flow, normal fan operation, collector water flow, normal temperatures in said combustion unit and said collector, and normal operation of said pressure responsive damper and is operable to open said relief stack damper and close said combustion unit inlet damper upon indication of an unsafe operating condition by any of said last named responsive switches.

21. In an apparatus of the character described, a material melting furnace, a combustion chamber for burning residual combustible substances in the combustion products from said furnace, a heat exchanger positioned to be heated by combustion in said combustion chamber, means for supplying blast air through said heat exchanger to said furnace, means to cause flow of combustion products to said combustion chamber, means intermediate said furnace and said combustion chamber for discharge to atmosphere of said combustion products, means controlling said discharge means, and means responsive to an unsafe condition of operation of said apparatus to actuate said controlling means for discharge of said combustion products through said discharge means.

22. In an apparatus of the character described, a material melting furnace, a combustion chamber for burning residual combustible substances in the combustion products from said furnace, and a dust collector unit connected in series; a heat exchanger positioned to be heated by combustion in said combustion chamber, means for supplying blast air through said heat exchanger to said furnace, means to cause flow of combustion products to said combustion chamber and said dust collector unit, means intermediate said furnace and said combustion chamber for discharge to atmosphere of said combustion products, means controlling said discharge means, and means responsive to an unsafe condition of operation of said dust collector unit to stop the flow of blast air and to actuate said controlling means for discharge of said combustion products through said discharge means.

References Cited in the file of this patent

UNITED STATES PATENTS

| | | |
|---|---|---|
| 1,872,569 | Boegehold | Apr. 16, 1932 |
| 2,561,347 | Drake | July 24, 1951 |
| 2,625,386 | Leone | Jan. 13, 1953 |